(12) United States Patent
Kishimoto

(10) Patent No.: US 6,424,402 B1
(45) Date of Patent: *Jul. 23, 2002

(54) LIQUID CRYSTAL DISPLAY AND METHOD FOR MANUFACTURING THE SAME

(75) Inventor: Katsuhiko Kishimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 118 days.

This patent is subject to a terminal disclaimer.

(21) Appl. No.: 09/607,967

(22) Filed: Jun. 30, 2000

(30) Foreign Application Priority Data

Jul. 5, 1999 (JP) .......................................... 11-190428
Apr. 25, 2000 (JP) ........................................ 2000-123637

(51) Int. Cl.⁷ .......................................... G02F 1/1339
(52) U.S. Cl. ........................ 349/156; 349/106; 349/110
(58) Field of Search ................................ 349/106, 110, 349/155, 156, 157

(56) References Cited

U.S. PATENT DOCUMENTS 6,072,557 A * 6/2000 Kishimoto .................. 349/156
6,147,729 A * 11/2000 Kurauchi et al. ........... 349/106

FOREIGN PATENT DOCUMENTS

JP          2000-19522 A        1/2000

* cited by examiner

Primary Examiner—Kenneth Parker
Assistant Examiner—David Chung
(74) Attorney, Agent, or Firm—Nixon & Vanderhye P.C.

(57) ABSTRACT

A liquid crystal display 1 comprises a first substrate unit 2a including a first substrate 21a, colored resin layers 5, and a black matrix 4 positioned between said colored resin layers 5 for blocking light; a second substrate unit 2b; and a liquid crystal layer 3 sandwiched between said first substrate unit 2a and said second substrate unit 2b. Said first substrate unit 2a further includes a wall-like structure 6 constituted of the overlapped portion of said colored resin layers 5 and said black matrix 4, for dividing said liquid crystal layer 3 into plural liquid crystal regions and to axially symmetrically align liquid crystal molecules within said liquid crystal regions. The surface of said colored resin layers 5 other than the area overlapping said black matrix 4 is flat.

13 Claims, 7 Drawing Sheets

(a)

(b)

(a)

(b)

(a)

(c)

(b)

(d)

(a)

(b)

LIQUID CRYSTAL DISPLAY AND METHOD FOR MANUFACTURING THE SAME

FIELD OF THE INVENTION

The present invention relates to a liquid crystal display and method for manufacturing the same, and especially, to a liquid crystal display and method for manufacturing the same having liquid crystal molecules axially symmetrically aligned within each liquid crystal region of a liquid crystal layer divided into plural regions by a wall-like structure.

DESCRIPTION OF THE RELATED ART

Heretofore, TN (twisted nematic)-type liquid crystal displays and STN (super twisted nematic)-type liquid crystal displays including nematic liquid crystal molecules were used as display devices utilizing electrooptical effect. Techniques aimed at widening the viewing angle of these liquid crystal displays are being developed actively.

One example of the technique for widening the viewing angle of the TN-type liquid crystal display is disclosed in Japanese Patent Application Laid-Open Publication Nos. 6-301015 and 7-120728. The applications disclose a liquid crystal display having liquid crystal molecules axially symmetrically aligned within each liquid crystal regions of a liquid crystal layer divided into plural regions by a polymer wall, the display so called the ASM (axially symmetrically aligned microcell)-mode liquid crystal display. According to the disclosure, the typical liquid crystal display has each liquid crystal region substantially surrounded by a polymer wall formed to correspond to each pixel basis. The ASM-mode liquid crystal display has liquid crystal molecules aligned axially symmetrically. Therefore, no matter what direction the observer views the liquid crystal display, the contrast will not vary greatly. In other words, the liquid crystal display has a wide viewing angle characteristic. The ASM-mode liquid crystal display disclosed in the above-mentioned patent publications is manufactured by performing a polimerization induction—phase separation to a mixture of polimerized material and liquid crystal material.

The conventional method for manufacturing the ASM-mode liquid crystal display is explained with reference to FIG. 6 (prior art). First, a substrate manufactured by forming a color filter and an electrode on one surface of a glass substrate 21a' is prepared (step (a)). For simplicity, the electrode and the color filter formed on the upper surface of the glass substrate 21a' are not shown in the drawing. The method for manufacturing the color filter is explained later. Next, a polymer wall 6' for axially symmetrically aligning liquid crystal molecules are formed, for example in a lattice-shape, on the surface of the glass substrate 21a' equipped with the electrode and color filter (step (b)). In this step, a photosensitive resin material is spin-coated on the glass substrate 21a' to which the electrode and color filter are formed. Then, the substrate is exposed through a photo-mask having a predetermined pattern, and then developed. Thereby, a lattice-shaped polymer wall 6' is formed. The photosensitive resin material can either be negative or positive. Further, a resin material having no photosensitivity can also be used, though a step for forming a resist film must be added to the manufacturing steps.

On portions of the top of the polymer wall 6' are formed pillar-like protrusions 8', which are selectively formed on areas of the wall by patterning (step (c)). In the present step, photosensitive resin material is spin-coated, and then a photo-mask having a predetermined pattern is used to expose and develop the substrate and to form pillar-like protrusions 8'.

The surface of the glass substrate 21a' to which are formed polymer wall 6' and pillar-like protrusions 8' is coated with a vertical alignment agent 9' formed of polyimide and the like (step (d)).

On the other hand, an opposing glass substrate 21b' to which is formed an electrode is also coated with the vertical alignment agent 9' (steps (e) and (f)).

The two substrates 21a' and 21b' formed as above are adhered together, with the surfaces equipped with electrodes facing the inner direction, to form a liquid crystal cell (step (g)). The distance between the two substrates (cell gap; thickness of the liquid crystal layer) is defined by the sum of the height of the polymer wall 6' and the height of the pillar-like protrusion 8'.

Liquid crystal material is injected to the gap formed to the obtained liquid crystal cell through vacuum injection and the like (step (h)).

Lastly, the liquid crystal molecules within each liquid crystal region 31' are axially symmetrically aligned, for example, by applying voltage to the pair of electrodes being opposed (step (i)). The liquid crystal molecules 32' within each liquid crystal region separated by the polymer wall 6' are axially symmetrically aligned with a center axis 33' (perpendicular to both substrates) shown by the broken line of FIG. 6(i).

The cross-sectional structure of the conventional color filter will now be explained with reference to FIG. 7. On the glass substrate 21a' are formed a black matrix (BM) 4' for shading the space (blocking light) between colored patterns, and a colored resin layer 5' colored to red (R), green (G) and blue (B) corresponding to each pixel basis. An overcoat (OC) layer 51' having a thickness of approximately 0.5 to 2.0 $\mu$m made of acrylic resin or epoxy resin is formed above the colored resin layer 5' so as to improve the surface smoothness. Moreover, a transparent signal electrode indium-tin oxide (ITO) film 7a' is formed on the overcoat layer. The BM layer 4' is typically formed of a metallic chromium film having a thickness of approximately 100 to 150 nm. Resin materials colored by dyes and pigments are used to form the colored resin layer 5', and the thickness of the layer is typically approximately 1 to 3 $\mu$m.

The color filter can be manufactured by utilizing a method of patterning, through photolithography method, the photosensitive colored resin layer 5' formed on the substrate 21a'. For example, by utilizing photosensitive resin materials each colored to red (R), green (G) or blue (B), and performing formation/exposure/development for each of the three photosensitive colored resins (three times in total), an R/G/B color filter can be manufactured. The methods for forming the photosensitive colored resin layer 5' include applying liquid-phase photosensitive colored resin material (diluted with solvent) onto the substrate 21a' through spin-coating method, or transferring the photosensitive colored resin material in the form of a dry film to the substrate. By using the color filter formed as above to manufacture the ASM-mode liquid crystal display, a color liquid crystal display having a wide viewing angle characteristic is obtained.

However, the present inventors have discovered that the ASM-mode liquid crystal display and the method for manufacturing the same according to the prior art have the following problems. That is, though a wide viewing angle characteristic is obtained according to the conventional ASM-mode liquid crystal display, the structure of the ASM-mode display is complicated compared to the conventional TN or STN-type liquid crystal display. Therefore, the manufacturing steps and the manufacturing cost according to the ASM-mode display is increased, and relatively, the yield factor is decreased. Moreover, since the transmission rate of the panel directly above the polymer wall 6' (for axially symmetric alignment) is low compared to that of regions where the polymer wall 6' does not exist, it causes the brightness of the display to be reduced when the overlapping area of the polymer wall 6' is dislocated from the black matrix 4' (positioned to shade the space between the colored resin layers 5 of the color filter) and the pattern of the polymer wall 6' does not fit within the black matrix pattern. Moreover, when the polymer wall for controlling the alignment of the liquid crystal molecules are formed to have a steep tapered angle against the layer formed thereunder, the alignment of the liquid crystal molecules near the polymer wall is disordered. This causes light to be leaked from the area near the polymer wall even when the whole panel is displaying black, and causes deterioration of contrast. Moreover, the overcoat layer equipped to the display to flatten the color filter surface absorbs light, and causes the brightness of the display to be reduced.

SUMMARY OF THE INVENTION

The present invention aims at solving the above-mentioned problems. The present invention aims at providing a liquid crystal display and the method for manufacturing the same having a wide viewing angle characteristic, a high contrast and bright display, that can be manufactured at low cost and with improved yield factor.

In order to solve the above-mentioned problems, the present invention provides a liquid crystal display comprising a first substrate unit including a first substrate, colored resin layers, and a black matrix for shading the space (blocking light) between the colored resin layers; a second substrate unit; and a liquid crystal layer sandwiched between the first substrate unit and the second substrate unit: wherein the first substrate unit further comprises a wall-like structure composed of the overlapped portion of a lattice-shaped structure and the colored resin layers, for dividing the liquid crystal layer into plural liquid crystal regions, and to axially symmetrically align liquid crystal molecules within each liquid crystal region.

Moreover, the present invention provides a liquid crystal display, wherein the colored resin layers are formed so that the areas that are not overlapping the lattice-shaped structure have flat surfaces.

The present invention further provides a liquid crystal display, wherein the lattice-shaped structure has a cross-sectional shape that is gradationally tapered from the first substrate.

The present invention further provides a liquid crystal display, wherein the lattice-shaped structure has a thickness that is equal to or greater than the thickness of the colored resin layer.

Moreover, the present invention provides a liquid crystal display, wherein the lattice-shaped structure is formed of a transparent photosensitive resin material.

Even further, the present invention provides a liquid crystal display, wherein the lattice-shaped structure also serves as the black matrix.

The present invention further provides a liquid crystal display, wherein the black matrix is formed of a black-colored photosensitive resin material.

The present invention provides a method for forming a liquid crystal display comprising a first substrate unit including a first substrate, colored resin layers, and a black matrix for shading the space between the colored resin layers; a second substrate unit; and a liquid crystal layer sandwiched between the first substrate unit and the second substrate unit; wherein the first substrate unit further comprises a wall-like structure composed of the overlapped portion of a lattice-shaped structure and the colored resin layers, for dividing the liquid crystal layer into plural liquid crystal regions, and to axially symmetrically align liquid crystal molecules within each liquid crystal region; the method including the steps of: forming a black matrix made of a metal film on the first substrate; forming a lattice-shaped transparent structure having a cross-sectional shape that is gradationally tapered from the first substrate by using a transparent photosensitive resin material and through photolithography method; and forming colored resin layers so that a portion of each is overlapped to the tapered portion of the lattice-shaped transparent structure pattern.

Moreover, the present invention provides a method for forming a liquid crystal display comprising a first substrate unit including a first substrate, colored resin layers, and a black matrix for shading the space (blocking light) between colored resin layers; a second substrate unit; and a liquid crystal layer sandwiched between the first substrate unit and the second substrate unit; wherein the first substrate unit further comprises a wall-like structure composed of the overlapped portion of a lattice-shaped structure and the colored resin layers, for dividing the liquid crystal layer into plural liquid crystal regions, and to axially symmetrically align liquid crystal molecules within each liquid crystal region; the method including the steps of: forming a lattice-shaped structure that also serves as the black matrix having a cross-sectional shape that is gradationally tapered from the first substrate by using a black colored photosensitive resin material and through photolithography method; and forming colored resin layers so that a portion of each is overlapped to the tapered portion of the lattice-shaped structure also serving as the black matrix.

(Function)

The function of the present invention will now be explained. According to the invention, portions of the colored resin layers overlapping the lattice-shaped structure function as the polymer wall that generates the force for controlling and axially symmetrically align the liquid crystal molecules. Since the thickness of the lattice-shaped structure is equal to or greater than the thickness of the colored resin layer, a polymer wall having at least the same thickness as the lattice-shaped structure is formed to portions where the colored resin layers overlap the lattice-shaped structure. By setting the thickness of the lattice-shaped structure to 1.0 $\mu$m or greater, a sufficient alignment regulating force is obtained. According to the prior art liquid crystal display where the polymer wall is formed separately, the wall has to be positioned and formed accurately above the black matrix pattern. If not, the transmission rate of the liquid crystal cell is reduced, and the brightness of the display is deteriorated. However, according to one embodiment of the present invention, the black matrix also serves as the polymer wall (lattice-shaped structure), so there is no need to consider the alignment of the polymer wall and the black matrix. According to the invention, the manufacture margin of the display is increased, and the display brightness is maintained. According to another aspect of the invention, the lattice-shaped structure is formed by a transparent resin layer. In this case, there is a need to align the polymer wall (lattice-shaped structure) and the black matrix. However, since the black matrix is formed only to the space formed between the colored resin layers and not to other unnecessary areas, the deterioration of display brightness caused by forming the polymer wall is prevented. Moreover, since the cross-sectional shape of the lattice-shaped structure is gradually tapered from the substrate, the colored resin layers overlapping the lattice-shaped structure is also gradually tapered. If the slope of the polymer wall is steep, the alignment of the liquid crystal molecules near the substrate and the wall is disordered, and this may cause leakage of light. However, according to the present invention, the overlapped area of the colored resin layers and the lattice-shaped structure functioning as the polymer wall has a gradationally tapered cross-section that is not steep. According to the invention, the problem of light leakage is solved, and contrast is maintained at high level.

Moreover, since the surface of the colored resin layers other than the overlapping area is flat, solely the polymer wall generates the axially symmetric alignment force that acts to the liquid crystal. Therefore, it is easy to create a center axis of alignment to the center of each liquid crystal region divided by the polymer wall. For example, if the surface of the colored resin layer within each liquid crystal region is not flat, the liquid crystal molecules receive both the alignment force from the polymer wall and that from the uneven colored resin surface. This causes difficulty in fixing the axial position, and causes deterioration of the viewing angle.

DETAILED DESCRIPTION OF PREFERRED EMBODIMENTS

The preferred embodiments of the present invention will now be explained.
(Embodiment 1)

Figure 1:
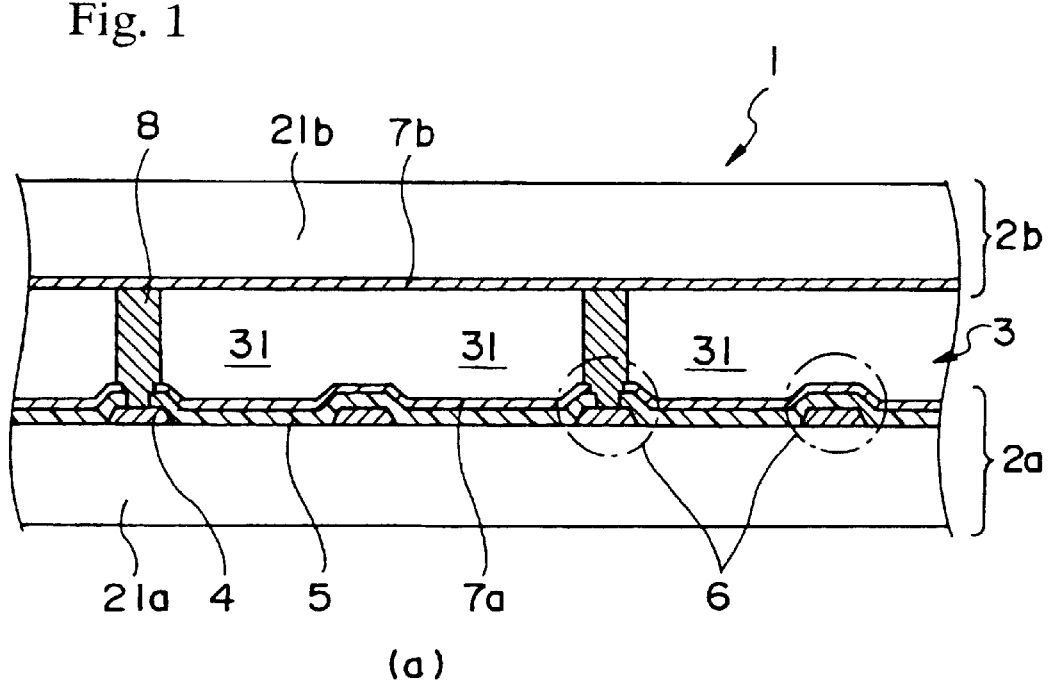
FIG. 1 is an explanatory cross-sectional view showing the liquid crystal display according to embodiment 1.
Figure 1:
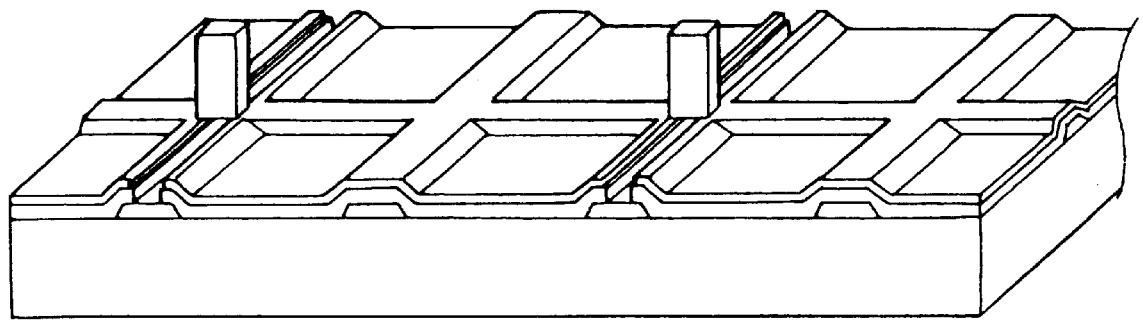
Figure 2:
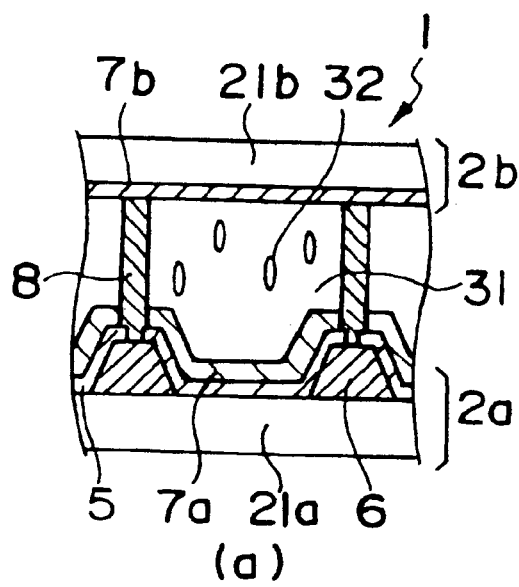
FIG. 2 is an explanatory view showing the performance of the liquid crystal display according to embodiment 1.
Figure 2:
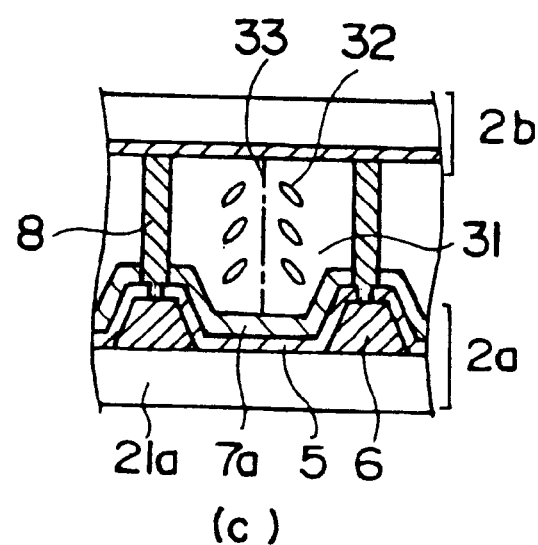
Figure 2:
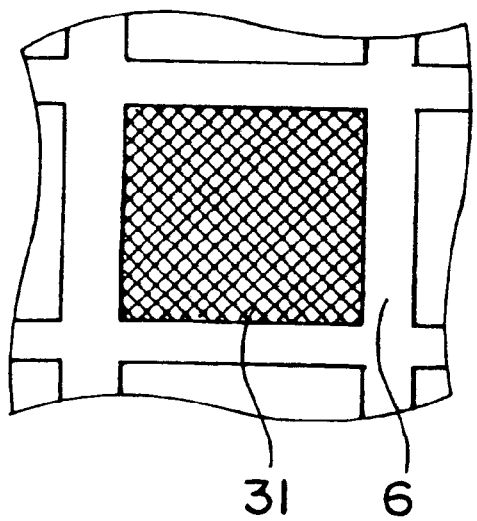
Figure 2:
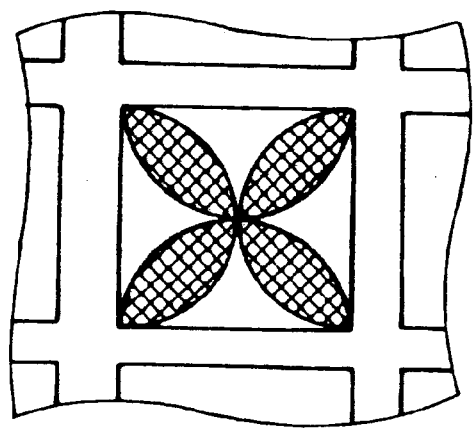
Figure 3:
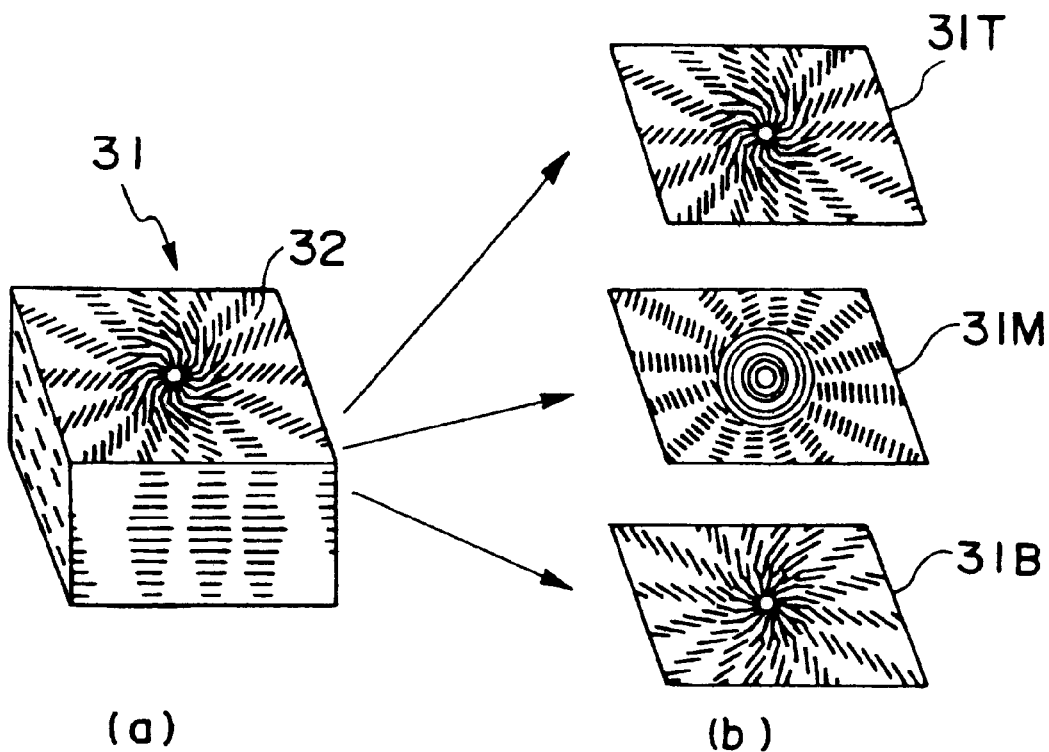
FIG. 3 is a view showing the axially symmetric alignment status of the liquid crystal molecules of the liquid crystal display according to embodiment 1.
Figure 4:
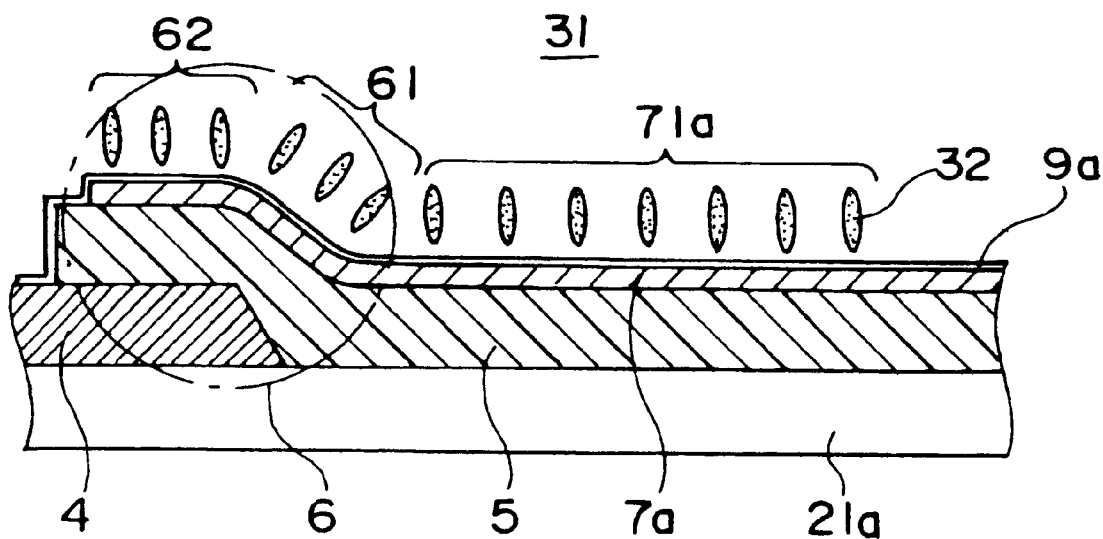
FIG. 4 is a view showing the alignment status of the liquid crystal molecules of the liquid crystal display according to embodiment 1.
Figure 5:
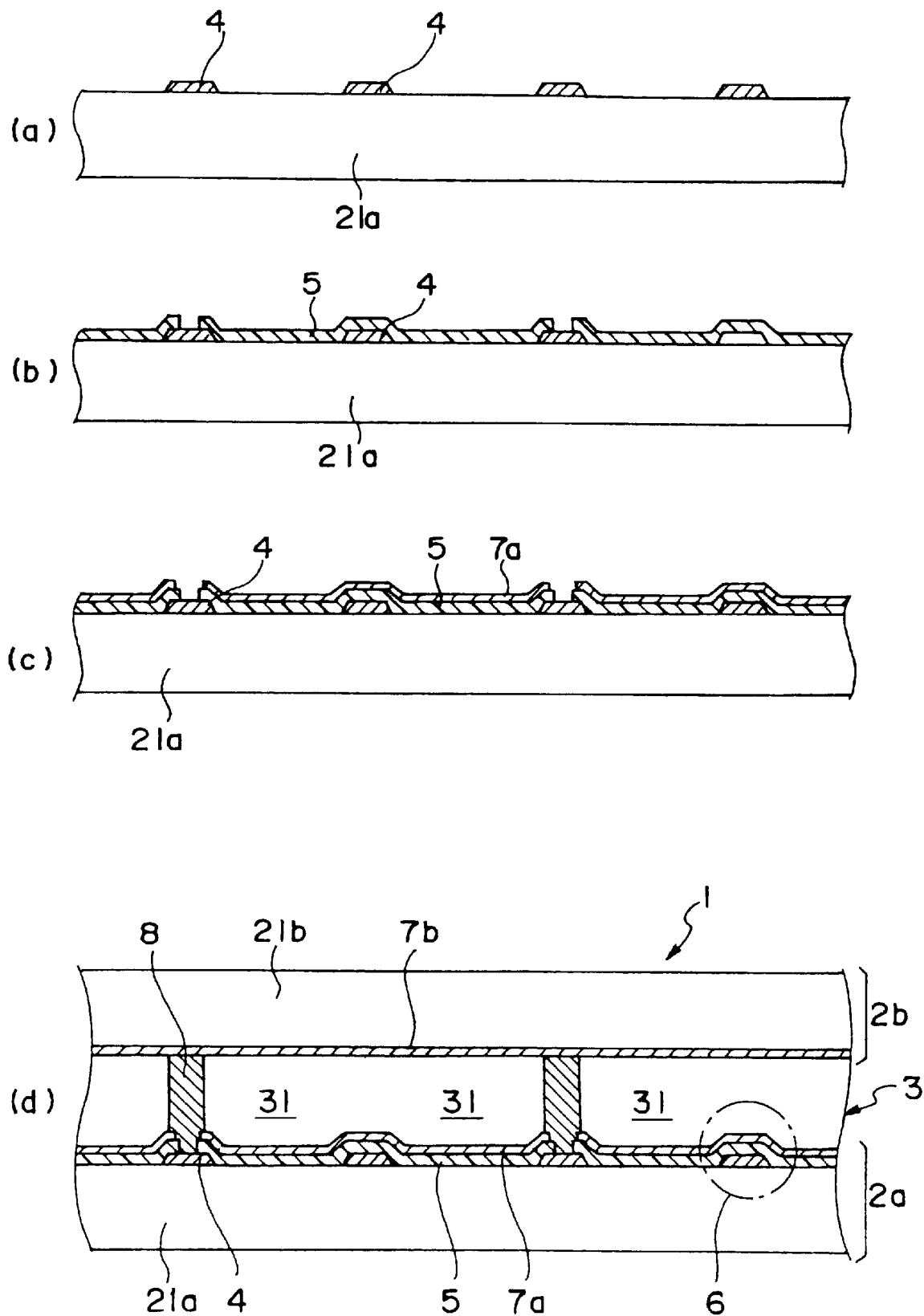
FIG. 5 is an explanatory view showing the method for manufacturing the liquid crystal display according to embodiment 1.
Figure 6:
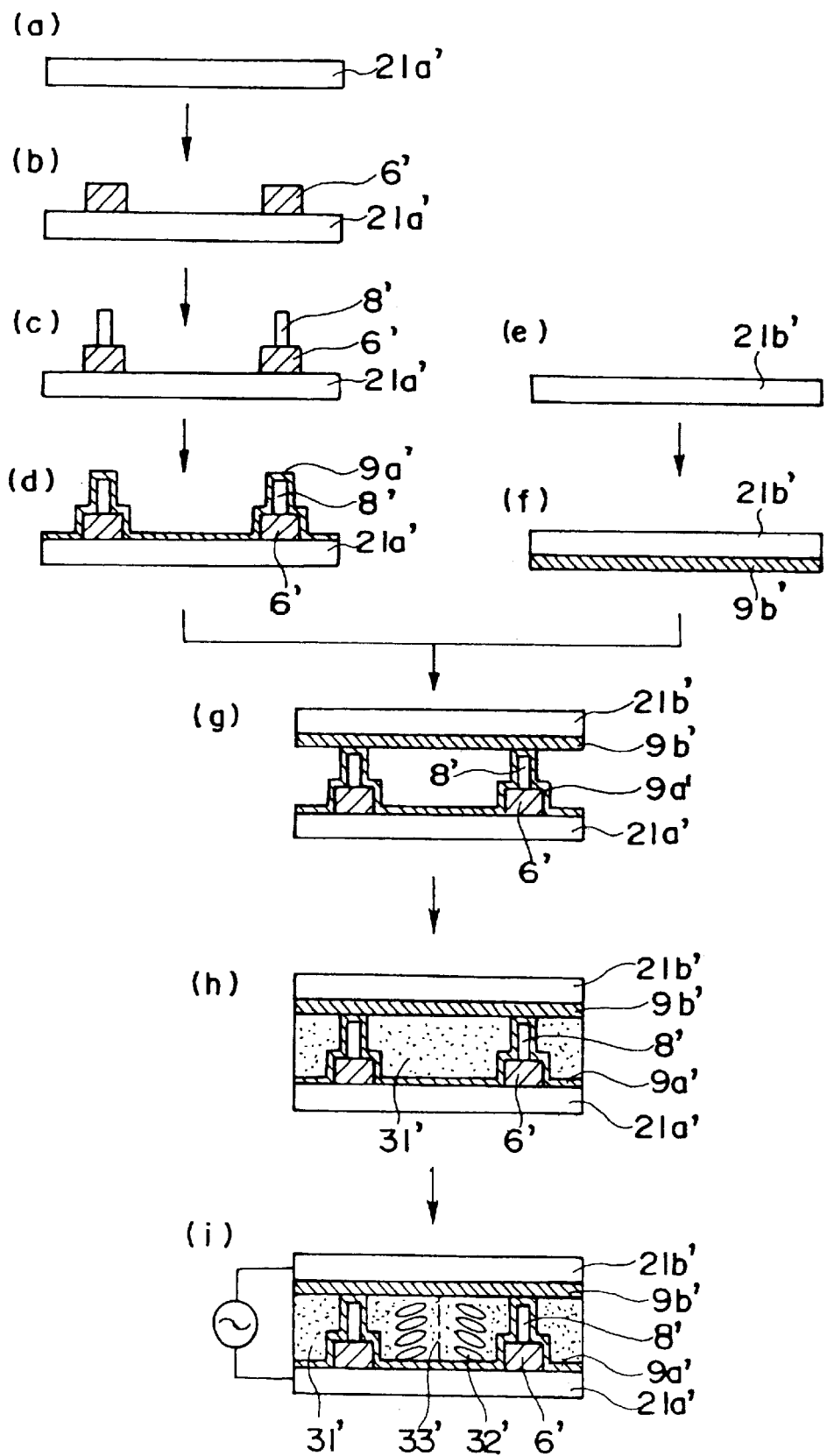
FIG. 6 is an explanatory view showing the method for manufacturing an ASM-mode liquid crystal display according to the prior art.
Figure 7:
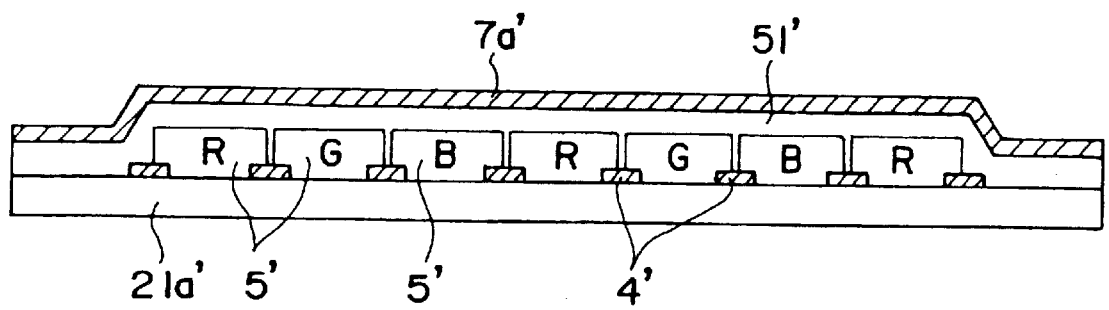
FIG. 7 is an explanatory cross-sectional view showing the color filter substrate of the prior art.

The liquid crystal display and method of manufacturing the same according to embodiment 1 of the present invention will now be explained with reference to FIGS. 1 through 5. FIG. 1 is a cross-sectional explanatory view of the liquid crystal display according to embodiment 1. FIG. 2 is a view explaining the operation of the liquid crystal display according to embodiment 1. FIG. 3 is a view showing the axially symmetric alignment status of liquid crystal molecules according to the liquid crystal display of embodiment 1. FIG. 4 is a view showing the alignment status of the liquid crystal molecules according to the liquid crystal display of embodiment 1. FIG. 5 is an explanatory view showing the method for manufacturing the liquid crystal display according to embodiment 1.

Embodiment 1 will now be explained. The cross-sectional view of a liquid crystal display according to the present embodiment is shown in FIG. 1. Embodiment 1 utilizes a liquid crystal material with a negative anisotropy of dielectric constant, and a vertical alignment film, but the present embodiment is not limited to such example. The liquid crystal display 1 according to embodiment 1 comprises a first substrate unit 2a, a second substrate unit 2b, and a liquid crystal layer 3 sandwiched between the first and second substrate units and including liquid crystal molecules (not shown) having negative anisotropy of dielectric constant. The first substrate unit 2a is formed as follows. On a transparent first substrate 21a, such as a glass substrate, is mounted a black matrix 4 formed of a lattice-shaped black resin material. Further, above the black matrix 4 are formed colored resin layers 5 of red, green and blue, wherein at least one portion of each layer 5 is placed to overlap the black matrix 4. Moreover, a first transparent electrode 7a formed of ITO (indium tin oxide) and the like is formed on the upper surface of the first substrate 21a facing the liquid crystal layer 3. The overlapping area of the lattice-shaped black matrix 4 and the colored resin layers 5 constitute a polymer wall 6 having a slanted cross-section. The polymer wall 6 divides the liquid crystal layer 3 into plural liquid crystal regions 31, and also acts to axially symmetrically align the liquid crystal molecules within each liquid crystal region 31. In other words, each liquid crystal region 31 is defined by the wall-like structure 6, and the wall-like structure 6 substantially surrounds the liquid crystal region 31. Moreover, pillar-like protrusions 8 for defining the thickness (cell gap) of the liquid crystal layer 3 are selectively formed on the upper surface of areas of the wall-like structure 6. On the surface facing the liquid crystal layer of the above-explained first substrate 21a and covering at least the first transparent electrode 7a is mounted a vertical alignment film (not shown), for aligning the liquid crystal molecules (not shown) of the liquid crystal layer 3. Thereby, the first substrate unit 2a is formed. Next, the second substrate portion 2b is formed as explained below. On the surface of a transparent second substrate 21b formed of a glass substrate and the like facing the liquid crystal layer 3 is mounted a second transparent electrode 7b formed of ITO and the like. Further, a vertical alignment film (not shown) is applied to cover the second transparent electrode 7b. The wall-like structure 6 is formed, for example, in a lattice-shape corresponding to each pixel basis region. However, the arrangement of the wall-like structure 6 is not limited to such example. Further, the pillar-like protrusions 8 should be positioned selectively on some of the wall-like structure with appropriate density, so that sufficient intensity is obtained.

The structure and the method for driving the first and second transparent electrodes 7a and 7b (which are for driving the liquid crystal layer 3) can be selected from known electrode structures and known driving methods. For example, active matrix, simple matrix, or plasma address (PALC) can be applied to the first and second electrodes. Moreover, the first substrate unit and the second substrate unit can be replaced according to the applied electrode structure and driving method. In other words, the pillar-like protrusions 8 can be formed on the second substrate unit.

The operation of the liquid crystal display 1 according to embodiment 1 is explained with reference to FIGS. 2(a) through (d). As shown in FIG. 2(a), when no voltage is applied to the liquid crystal region 31, the liquid crystal molecules 32 are aligned vertically against the substrate surface by the alignment regulating force of the vertical alignment film (not shown) formed on the surfaces of the substrate units 2a and 2b facing the liquid crystal layer 3. When the panel is observed through a polarized microscope in crossed-Nicols condition, dark field is observed, as shown in FIG. 2(b) (normally black mode). When voltage for displaying gray-scale is applied to the liquid crystal region 31, a force that aligns the longitudinal axis of the molecules to be perpendicular to the direction of the electrical field is applied to the liquid crystal molecules 32 having negative anisotropy of dielectric constant. Therefore, as shown in FIG. 2(c), the molecules are slanted from the axis perpendicular to the substrate (gray-scale display condition). At this time, by the function of the wall-like structure 6, the liquid crystal molecules 32 within the liquid crystal region 31 is axially symmetrically aligned with a center axis 33 positioned as shown by the broken line of FIG. 2(c). When the panel is observed through a polarized microscope in crossed-Nicols condition, optical quenching patterns in directions along the polarizing axes are observed, as shown in FIG. 2(d).

In the present specification, the term axially symmetric alignment includes concentric (tangential) alignment and radial alignment. It further includes spiral alignment as shown in FIG. 3. The spiral alignment can be obtained by providing a twist alignment force to the liquid crystal material by adding a chiral agent thereto. As shown in FIG. 3(b), the liquid crystal has a spiral alignment near the top portion 31T and the bottom portion 31B of the liquid crystal region, and has a concentric or tangential alignment near the middle portion 31M of the region. The liquid crystal has a twisted alignment along the thickness direction of the liquid crystal layer. The center axis of the axially symmetric alignment substantially corresponds to the normal direction of the substrate.

By axially symmetrically aligning the liquid crystal molecules, the viewing angle performance of the panel can be improved. When the liquid crystal molecules are axially symmetrically aligned, the anisotropy of refractive constant of the liquid crystal molecules is averaged at all azimuth directions. Therefore, the liquid crystal display is free from problems caused by the viewing angle performance being differed greatly according to the azimuth directions of the conventional TN mode liquid crystal display when gray-scale is displayed. Moreover, by providing a horizontal alignment film and a liquid crystal material having a positive anisotropy of dielectric constant to the display, axially symmetric alignment can also be obtained when no voltage is applied to the panel. If the liquid crystal molecules are axially symmetrically aligned at least when voltage is applied, a wide viewing angle characteristic is realized.

The following explains in detail the wall-like structure 6 that is equipped to the liquid crystal display according to embodiment 1, and the behavior of the liquid crystal molecules near the wall 6. FIG. 4 shows the partially enlarged view near the wall-like structure 6 and near the liquid crystal region 31 of the liquid crystal display 1 of FIG. 1. As shown in FIG. 4, when no voltage is applied thereto, the liquid crystal molecules 32 are vertically aligned, by the alignment regulating force of the vertical alignment film 9a, above each of the following: the surface 71a of the first transparent electrode 7a above the flat area of the colored resin layer 5 formed on the first substrate 21a, the side surface 61 of the wall-like structure 6 that is slanted and where the colored resin layer 5 is overlapped with the black matrix 4, and the upper surface 62 of the wall-like structure 6. The alignment of the liquid crystal molecules placed above the upper surface 62 of the wall-like structure 6 does not contribute to display, since black matrix 4 exists thereunder. This means that the disorder of the liquid crystal alignment near the end portion of the ITO film 7a or the colored resin layer 5 will not deteriorate the display performance. Since the side surface of the wall-like structure 6 is formed by the colored resin layer 5 overlapping the black matrix 4, it is gently sloped, and will not cause disorder of the alignment of liquid crystal molecules 32. If the black matrix 4 and the colored resin layer 5 are formed to have the same thickness, the sloped angle of the wall-like structure 6 is typically ranged from 5 to 50 degrees. When the colored resin layer 5 is formed on the substrate by a spin-coat method, the sloping angle tends to be small, and when it is formed on the substrate by a dry-film-lamination method, the sloping angle tends to be large. However, no alignment disorder of the molecules was observed by both methods.

According to the conventional method, an overcoat material first flattened the difference in level above the overlapping area of the colored resin layer and the black matrix. Then, a polymer wall was formed above the area for axially symmetrically aligning the liquid crystal molecules. However, according to the conventional method, a step for forming the overcoat layer and a step for forming the polymer wall were additionally required, which complicated the manufacturing steps, increased the manufacturing cost, and deteriorated the yield factor. Moreover, when the sloping angle of the cross-section of the polymer wall against the substrate becomes great, the difference between the pre-tilt angle of the liquid crystal molecules near the polymer side wall and the pre-tilt angle of the liquid crystal molecules near the flat colored resin layer becomes large. As a result, the pre-tilt angle of the liquid crystal molecules is changed drastically and intermittently near the polymer wall, causing alignment disorder. In order to prevent this, a process for setting the sloping angle of the polymer wall to approximately below 50 degrees was added to the conventional method, making it difficult to control the manufacturing steps. Even further, the transmission rate of the liquid crystal cell was somewhat reduced by the light absorption of the overcoat layer, and therefore, the brightness of the display was reduced according to the prior art.

The method for manufacturing the liquid crystal display 1 of embodiment 1 will now be explained in detail. The first substrate unit 2a is manufactured as follows. A photosensitive black-colored resin material is applied by a spin-coat method to have a thickness of 1 $\mu$m on the first transparent substrate 21a such as a glass substrate. A mask having a predetermined pattern is utilized to form the black matrix 4 by a photolithography method (FIG. 5(a)). The exposure/develop conditions are adjusted so that the cross-section of the black matrix 4 is somewhat tapered (approximately below 80 degrees). Unlike the conventional method, there is no need to limit the taper angle to below 50 degrees according to the present invention. Since the present method has a wider margin, the yield factor for manufacture is improved. After forming the black matrix 4, a striped color resin layer 5 is formed. The film thickness of the colored resin layer 5 is set to 1.0 $\mu$m. The width of the black matrix is set to 50 $\mu$m in portions where the black matrix is used to block light between the colored resin layers, and the width is set to 30 $\mu$m in other portions where it is used to axially symmetrically align the liquid crystal molecules. Moreover, the interval spaces between the colored resin layers 5 are set to 20 μm (FIG. 5(*b*)). The size of each liquid crystal region 31 is set to approximately 160 μm×140 μm. Thereafter, an ITO film 7a with a thickness of 300 nm is formed on the whole upper surface of the first substrate 21a by sputtering method, and then, patterning is performed thereto (FIG. 5(*c*)). Thereafter, the pillar-like protrusions 8 for defining the cell gap are formed by photolithography method using a photosensitive resin, such as a photosensitive acrylic resin, on the wall-like structure 6 with appropriate intervals. The film thickness of the photosensitive resin, corresponding to the height of the pillar-like protrusion, is set to approximately 5.0 μm. Then, JALS-204 (material manufactured by JSR) is spin-coated onto the surface of the first substrate 2a to form a vertical alignment film (not shown).

On the other hand, the second substrate unit 2b is formed as follows. An ITO film is formed on the second transparent substrate 21b, such as a glass substrate. The ITO film is then patterned to form a second transparent electrode 7b having a thickness of 100 nm. Then, a JALS-204 (material manufactured by JSR) is spin-coated onto the surface of the second electrode 7b, to form a vertical alignment film (not shown).

The first substrate unit 2a and the second substrate unit 2b manufactured as above is then assembled (FIG. 5(*d*)). The gap between the first substrate unit 2a and the second substrate unit 2b is defined by the sum of the height of the wall-like structure 6 formed on the first substrate 21a and the height of the pillar-like protrusion 8 having a height higher than that of the wall-like structure.

According to the present embodiment, the cell gap is set to approximately 6 μm. An n-type liquid crystal material (Δε=−4.0, Δn=−0.08, cell gap is 6 μm, and chiral agent is added so that the liquid crystal twist is 90 degrees) is injected between the assembled first substrate unit 2a and the second substrate unit 2b.

According to the liquid crystal display 1 of the present embodiment, it is preferable to have the liquid crystal molecules of each liquid crystal region 31 to be axially symmetrically aligned around one center axis. In order to form one center axis to each liquid crystal region 31, the axially symmetric alignment operation explained in detail below is preferably performed.

Only by injecting the liquid crystal material to the cell, there may be formed plural center axes within each liquid crystal region 31 when voltage is applied, and therefore, plural axially symmetric alignment regions may be formed within the region 31. When plural center axes are formed within one liquid crystal region 31, the voltage-transmission characteristic curve of the cell may show different transmission rate for the same voltage (show hysteresis), one related to increasing voltage and one related to decreasing voltage. When voltage is applied to the liquid crystal cell to which only liquid crystal material is injected, and when the applied voltage is gradually increased, a plurality of center axes are formed at first. When voltage of over half the vth (threshold voltage: voltage providing 10% relative transmission rate) is continuously applied, the plural center axes 33 become together as one axis for each liquid crystal region 31 defined by the wall-like structure 6. Therefore, it is preferable to carry out the axially symmetrical alignment, in which voltage of over half the Vth is applied to the liquid crystal panel. Moreover, the liquid crystal display according to the present invention should preferably be driven within the voltage range between half the Vth to a saturation voltage Vst (voltage providing maximum transmission rate). When the drive voltage drops under half the Vth, plural center axes are formed, and the voltage-transmission rate characteristic may become unstable.

The liquid crystal region 31 of the liquid crystal cell obtained by the present embodiment is observed utilizing a polarizing microscope (crossed-Nicols) during transmission mode where no voltage is applied thereto. When no voltage is applied, the liquid crystal region 31 presents a dark field (normally black mode). Through polarizing microscope observation under crossed-Nicols state, the boundary between the wall-like structure 6 and the liquid crystal region 31 cannot be observed. Under the black-display condition, no leakage of light is observed throughout the whole cell, and a display with high contrast ratio is obtained.

(Embodiment 2)

Figure 8:
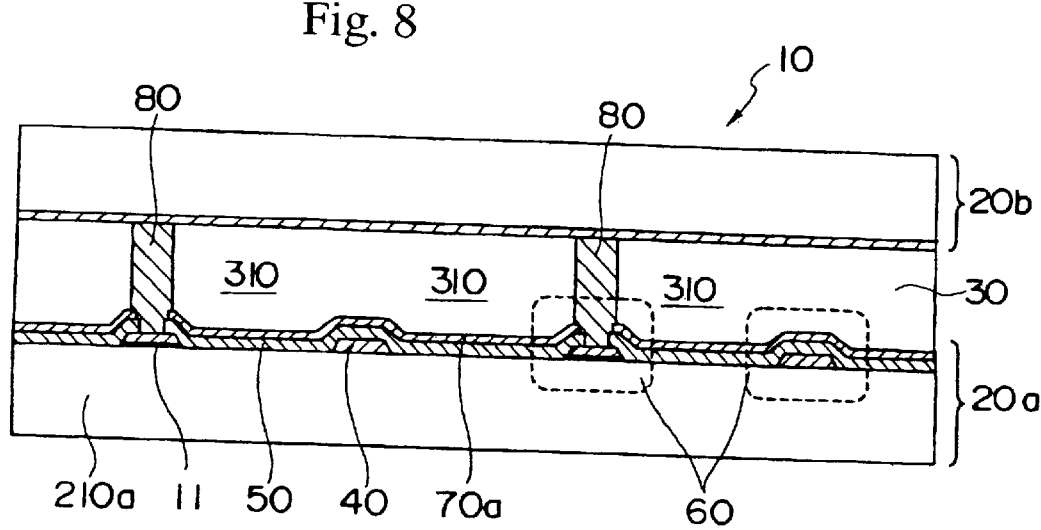
FIG. 8 is an explanatory cross-sectional view showing the liquid crystal display according to embodiment 2.
Figure 8:
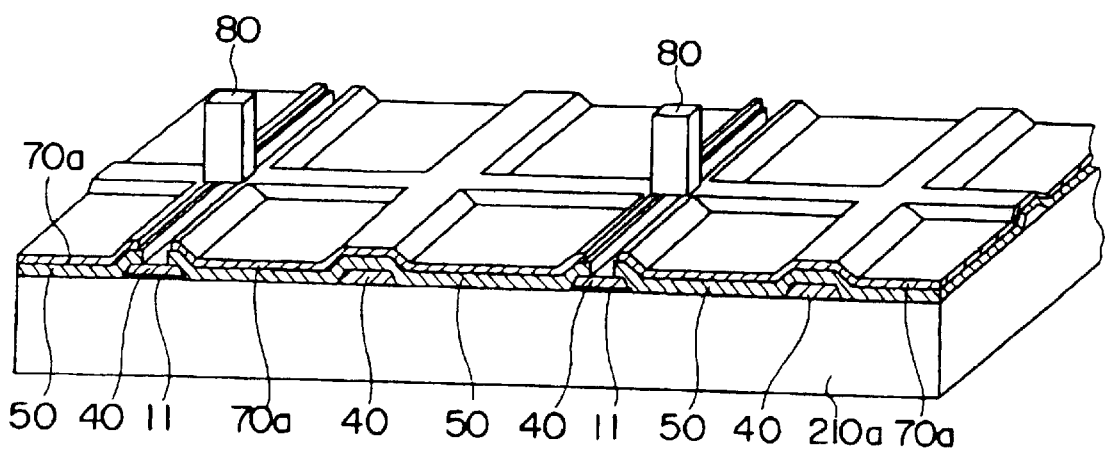

FIG. 8 shows the cross-sectional view of a liquid crystal display 10 according to embodiment 2 of the present invention. FIG. 8 shows a typical structure of the liquid crystal display according to embodiment 2, wherein (a) is a partially enlarged vertical cross-sectional view, and (b) is a perspective view showing a first substrate unit 20a of FIG. 8(*a*) in tridimensional axially symmetric view. The liquid crystal display 10 of embodiment 2, similar to that of embodiment 1, comprises a first substrate unit 20a, a second substrate unit 20b, and a liquid crystal layer 30 sandwiched therebetween including liquid crystal molecules having negative anisotropy of dielectric constant (not shown). The structure of liquid crystal display 10 is similar to that of embodiment 1 except for the first substrate unit 20a, and therefore, detailed explanation of only the first substrate unit 20a will be provided. The first substrate unit 20a is formed as follows.

On a transparent first substrate 210a, such as a glass substrate, is formed a stripe-shaped black matrix 11 made of chromium oxide. Further, lattice-shaped structure 40 made of transparent resin is formed so that at least a portion of the structure 40 covers the black matrix 11. On the lattice-shaped structure 40 are formed red/green/blue colored resin layers 50, at least a portion of each overlapping the lattice-shaped structure 40. Moreover, a first transparent electrode 70a made for example of ITO (indium tin oxide) is formed on the upper surface of the first substrate 210a facing the liquid crystal layer 30.

The area in which the lattice-shaped transparent structure 40 and the colored resin layer 50 are overlapped constitutes a wall-like structure 60 with a slanted cross-section. The wall-like structure 60 divides the liquid crystal layer 30 into plural liquid crystal regions 310, and also acts to axially symmetrically align the liquid crystal molecules within the liquid crystal region 310. In other words, each liquid crystal region 310 is defined by the wall-like structure 60, and the wall-like structure 60 substantially surrounds the liquid crystal region 310.

Unlike embodiment 1, according to embodiment 2, the black matrix 11 exists only between the colored resin layers. The other portions of the lattice are formed by the transparent resin structure surrounding the liquid crystal regions 310. Accordingly, the liquid crystal molecules positioned above the transparent structure will also contribute to the display, and the aperture rate of the panel can be improved. Thereby, a liquid crystal display with brightness can be obtained.

Figure 9:
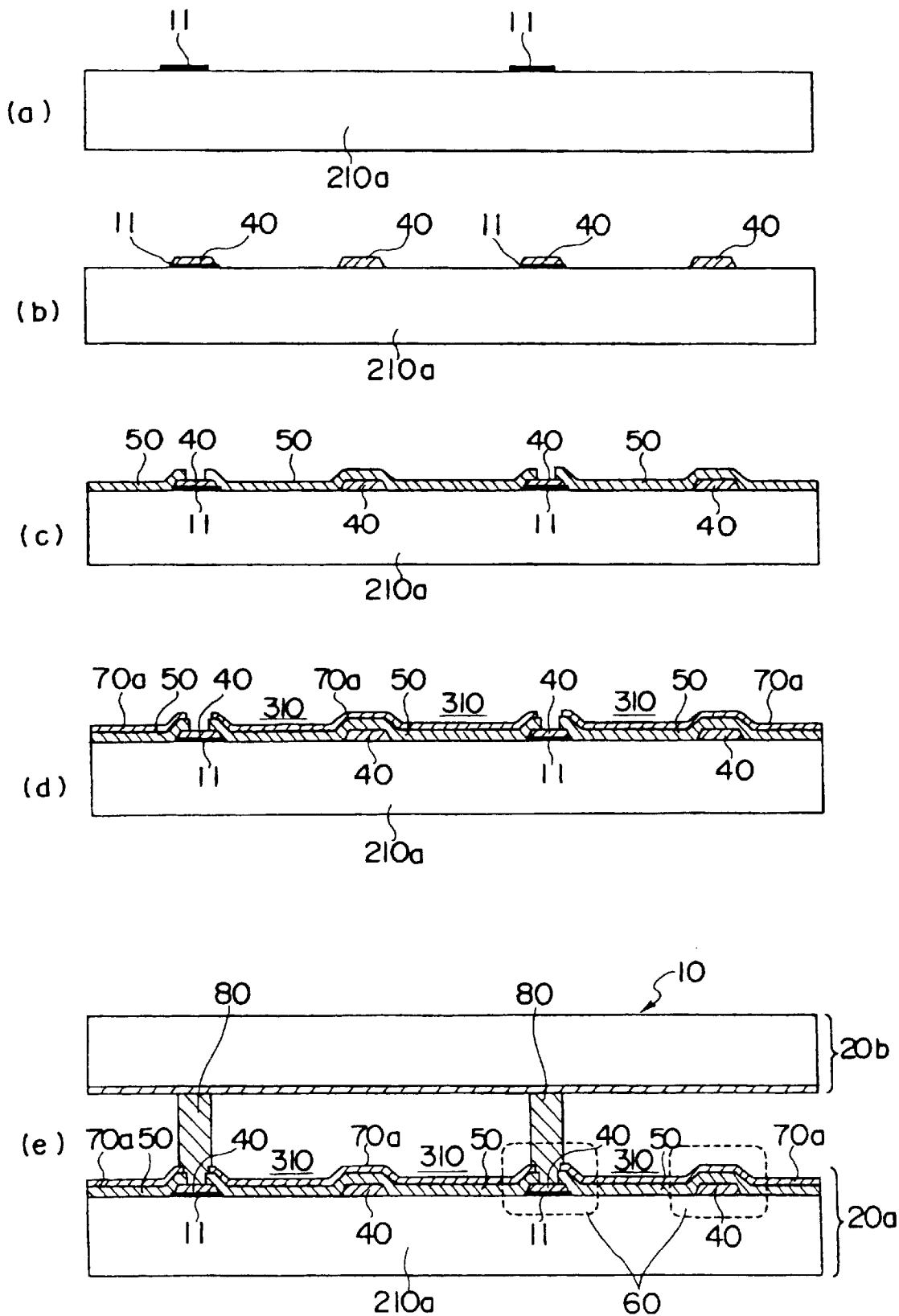
FIG. 9 is an explanatory view showing the method for manufacturing the liquid crystal display according to embodiment 2.

The method for manufacturing the liquid crystal display 10 according to embodiment 2 will now be explained in detail with reference to FIG. 9. The first substrate unit 20a is formed as follows. A film of chromium oxide (100 nm) and chrome (50 nm) is formed on the first transparent substrate (glass substrate) 210a by sputtering method. Then, a striped black matrix 11 with a width of 40 μm is patterned through photolithography method utilizing a predetermined mask (FIG. 9(a)).

After forming the black matrix, a transparent photosensitive resin is spin-coated onto the substrate to a thickness of 1.0 μm. Then, through photolithography method using a predetermined mask, a lattice-shaped transparent structure 40 is formed (FIG. 9(b)). The width of the lattice-shaped transparent structure 40 is set to 50 μm above the black matrix 11, and set to 30 μm in other areas. Moreover, the exposure/development conditions are adjusted so that the cross-section of the lattice-shaped transparent structure 40 is somewhat tapered (approximately below 80 degrees). Since unlike the conventional method, the present embodiment does not limit the cross-sectional angle to approximately 50 degrees or less, and therefore, provides a wider manufacture margin and improves the yield factor.

After forming the lattice-shaped transparent structure 40, the stripe-shaped colored resin layers 50 are manufactured. The thickness of the colored resin layer is set to 1.0 μm. The gap or interval between the colored resin layers is set to 20 m (FIG. 9(c)).

The size of the liquid crystal region 310 is set to 76 μm×74 μm. Thereafter, an ITO film 70a is formed on the whole upper surface of the first substrate 210a by sputtering method to a thickness of 300 nm. Then, the ITO film is patterned (FIG. 9(d)).

Then, pillar-like protrusions 80 for defining the cell gap of the liquid crystal layer are discretely formed using a photosensitive acrylic resin and the like to the upper surface of some of the wall-like structure 60 by a photolithography method. The thickness of the photosensitive resin corresponding to the height of the pillar-like protrusion 80 is set to approximately 5.0 μm. Thereafter, JALS-204 (material manufactured by JSR) is spin-coated onto the surface of the first substrate 20a to form a vertical alignment film (not shown). The following steps for forming the liquid crystal display 10 according to embodiment 2 are the same as the steps according to embodiment 1 (FIG. 9(e)).

Similar to embodiment 1, the deterioration of display contrast caused by the alignment disorder of liquid crystal molecules near the wall-like structure 60 is not observed in the display according to embodiment 2. According to the embodiment, the control margin for forming the lattice-shaped transparent structure 40 is not strict, and there is no need to form an overcoat layer. Therefore, the number of steps for manufacturing the display is reduced, and the display according to the present embodiment is free from problems related to absorption of light by the overcoat layer.

According to embodiment 2, the step for forming the lattice-shaped structure and the step for forming the black matrix is separate. This means that the number of steps for forming the display according to embodiment 2 is greater than the number of steps for forming the display according to embodiment 1. However, in contrast, the black matrix is positioned only between the colored resin layers, and the portions of the lattice-shaped structure other than what is positioned between the colored resin layers is transparent according to embodiment 2. Therefore, the aperture rate of the first substrate 20a is increased, and a liquid crystal display having improved brightness is obtained. For example, compared to an example in which the whole lattice-shaped structure of embodiment 2 is formed of material that blocks light, the present embodiment 2 with a transparent lattice-shaped structure has an aperture rate increased by approximately 40% from that of the comparison example. The present effect is more noticeable when the size of the liquid crystal regions 310 are reduced. Therefore, when creating a high-definition liquid crystal display, the structure according to embodiment 2 of the present invention is most suitable.

As mentioned above, according to the present invention, a liquid crystal display having a wide viewing angle characteristic can be obtained with reduced manufacturing cost and improved yield factor, since there is no need according to the invention to separately provide, after forming a color filter portion, a polymer wall for axially symmetrically aligning the liquid crystal molecules. Moreover, according to the method for manufacturing the display of the present invention, the step for forming the overcoat layer for flattening the color filter surface is no further necessary. Therefore, in addition to reduced manufacturing steps and improved yield factor, the present method is advantageous in that it provides a liquid crystal display having improved brightness and improved transmission rate, since no light is absorbed by the overcoat layer. Even further, the liquid crystal display according to the invention has an advantageously high display contrast with no light leakage. Moreover, the present invention provides a liquid crystal display having designated relations between the thickness of the lattice-shaped structure and the thickness of the colored resin layer necessary for axially symmetrically controlling the alignment of liquid crystal molecules. Therefore, the present invention provides a liquid crystal display having a wide viewing angle, reduced number of manufacturing steps, improved brightness and higher contrast.

I claim:

1. A liquid crystal display comprising a first substrate unit including a first substrate, colored resin layers, and a black matrix for shading the space between said colored resin layers; a second substrate unit; and a liquid crystal layer sandwiched between said first substrate unit and said second substrate unit;

a lattice-shaped structure comprising a plurality of orthogonal members that intersect one another;

wherein said first substrate unit further comprises a wall-like structure including areas of overlap between the lattice-shaped structure and said colored resin layers, for dividing said liquid crystal layer into plural liquid crystal regions, and to axially symmetrically align liquid crystal molecules within each said liquid crystal region.

2. The liquid crystal display according to claim 1, wherein said colored resin layers are formed so that the areas that are not overlapping said lattice-shaped structure have flat surfaces.

3. The liquid crystal display according to claim 1, wherein said lattice-shaped structure has a cross-sectional shape that is gradationally tapered from said first substrate.

4. The liquid crystal display according to claim 1, wherein said lattice-shaped structure has a thickness that is equal to or greater than the thickness of said colored resin layer.

5. The liquid crystal display according to claim 1, wherein said lattice-shaped structure is formed of a transparent photosensitive resin material.

6. The liquid crystal display according to claim 1, wherein said lattice-shaped structure also serves as said black matrix.

7. The liquid crystal display according to claim 1, wherein said black matrix is formed of a black colored photosensitive resin material.

8. A method for forming a liquid crystal display comprising a first substrate unit including, a first substrate, colored resin layers, and a black matrix for shading the space between said colored resin layers; a second substrate unit;

and a liquid crystal layer sandwiched between said first substrate unit and said second substrate unit; wherein said first substrate unit further comprises a wall-like structure comprising the overlapped portion of a lattice-shaped structure and said colored resin layers, for dividing said liquid crystal layer into plural liquid crystal regions, and to axially symmetrically align liquid crystal molecules within each said liquid crystal region; said method including the steps of:

forming a black matrix made of a metal film on said first substrate;

forming a lattice-shaped transparent structure including a plurality of orthogonal members that intersect one another and having a cross-sectional shape that is gradationally tapered from said first substrate by using a transparent photosensitive resin material and through photolithography method; and forming colored resin layers so that a portion of each is overlapped to said tapered portion of said lattice-shaped transparent structure.

9. A method for forming a liquid crystal display comprising a first substrate unit including a first substrate, colored resin layers, and a black matrix for shading the space between said colored resin layers; a second substrate unit; and a liquid crystal layer sandwiched between said first substrate unit and said second substrate unit; wherein said first substrate unit further comprises a wall-like structure comprising the overlapped portion of a lattice-shaped structure and said colored resin layers, for dividing said liquid crystal layer into plural liquid crystal regions, and to axially symmetrically align liquid crystal molecules within each said liquid crystal region; said method comprising:

forming a lattice-shaped structure including a plurality of orthogonal members that intersect one another that also serves as said black matrix having a cross-sectional shape that is gradationally tapered from said first substrate by using a black colored photosensitive resin material and through photolithography method; and forming colored resin layers so that a portion of each is overlapped to said tapered portion of said lattice-shaped structure also serving as said black matrix.

10. A liquid crystal display comprising:

first and second substrates sandwiching a liquid crystal layer therebetween;

the first substrate supporting a lattice shaped structure including a plurality of orthogonal members that intersect one another;

a lattice shaped wall-like structure supported by the first substrate for dividing the liquid crystal layer into plural axially symmetric liquid crystal regions, said lattice shaped wall-like structure including said lattice shaped structure and areas of overlap between color filters and the lattice shaped structure.

11. The liquid crystal display of claim 10, further comprising pillar like projections provided over the wall-like structure for spacing the first and second substrates from one another.

12. The liquid crystal display of claim 10, wherein the lattice shaped structure comprises a black matrix.

13. The liquid crystal display of claim 10, further comprising pixel electrodes which partially overlap the lattice shaped structure.

* * * * *